United States Patent [19]

Rosenberry, Jr. et al.

[11] 4,425,521

[45] Jan. 10, 1984

[54] MAGNETIC SLOT WEDGE WITH LOW AVERAGE PERMEABILITY AND HIGH MECHANICAL STRENGTH

[75] Inventors: George M. Rosenberry, Jr., Hendersonville, Tenn.; John A. Mallick, Delanson; Eike Richter, Scotia, both of N.Y.

[73] Assignee: General Electric Company, Schenectady, N.Y.

[21] Appl. No.: 384,700

[22] Filed: Jun. 3, 1982

[51] Int. Cl.³ .............................................. H02K 3/48
[52] U.S. Cl. ..................................... 310/214; 310/254
[58] Field of Search ............... 310/214, 215, 181, 254, 310/259, 42, 258, 194

[56] References Cited

U.S. PATENT DOCUMENTS 2,386,673 10/1945 Fisher .................................. 310/214
3,904,785 9/1975 Baumann ............................ 427/120
4,293,787 10/1981 Motoya et al. ...................... 310/181

FOREIGN PATENT DOCUMENTS 686695 5/1964 Canada ................................ 310/214
516000 3/1926 Fed. Rep. of Germany ...... 310/214
1100499 1/1968 United Kingdom ................ 310/214

*Primary Examiner*—R. Skudy
*Attorney, Agent, or Firm*—William H. Steinberg; James C. Davis, Jr.; Marvin Snyder

[57] ABSTRACT

A magnetic wedge for use in toothed stators holds the stator windings in the slots formed between the teeth of the stator. The magnetic slot wedge comprises a stack of magnetic material with a width corresponding to the width of the slot. The laminations each have central bridge portions connecting a first and second magnetic region, the bridge portion saturating during machine operation. The bridge and the first and second magnetic regions define an opening which, when the laminations are stacked, form a channel having a narrowed entrance. A fiberglass rod fits inside the channel and provides axial stiffness to the stacked laminations which clamp on the fiberglass rod.

4 Claims, 3 Drawing Figures

MAGNETIC SLOT WEDGE WITH LOW AVERAGE PERMEABILITY AND HIGH MECHANICAL STRENGTH

This invention relates to a copending application Ser. No. 353,278 filed Mar. 1, 1982 and assigned to the same assignee as the present invention.

BACKGROUND OF THE INVENTION

This invention relates to AC machines and more particularly to slot wedges therefor, or top sticks as they are sometimes called.

In an AC machine having a toothed stator, slot wedges are used to hold the stator windings in the slots formed between the stator teeth. Slot wedges made of magnetic material are a significant means to improve the efficiency of an AC motor. Magnetic slot wedges reduce slot ripple in the air gap flux caused by the changing reluctance due to the slots, and also reduce the associated eddy current losses due to the interaction of the harmonics in the air gap flux with the conducting surface of the rotor. The magnetizing current required in the stator windings to generate the desired air gap flux is less with magnetic slot wedges, since more of the air gap flux is available for useful power production. However, closing the slot completely with magnetic material increases the leakage reactance of the motor, which in the case of an induction motor results in a reduction of power factor and of peak torque, and in a synchronous motor results in a reduction of peak torque and slower dynamic response.

The present methods of making magnetic slot wedges with wire or iron powder embedded in a carrier, generally do not allow easy shaping of the magnetic material in a way which reduces slotting harmonics or, as they are sometimes called, space harmonics, with a minimum increase in slot leakage reactance. Another problem is that attempts to manufacture magnetic slot wedges that are structurally sound and do not fail during operation have only been partially successful. Nonmagnetic slot wedges do not have the failure problems that magnetic slot wedges have. Thus, it is expected that the different magnetic forces, the different loss characteristics and the different thermal characteristics of the magnetic slot wedges are responsible for their limited life in actual operation.

To achieve reduced slot harmonic losses, stators with semiclosed slots have been used. Semiclosed slots, as the name implies, provide a narrow opening at the top of the slot and require random windings. Random windings are windings in which the relative position of one wire to another is not known until the wires are pushed through the narrow opening and pressed into the slot. Formed coil windings cannot be inserted into semiclosed slots. Formed coils are used for high voltage (above 600 volts) applications because of their superior turn and ground insulation properties and for larger machines (above 600 HP) because of their superior reliability, heat transfer capability and easy manufacturability in the larger coil sizes. When open slots are used in conjunction with magnetic slot wedges, formed coils can be used without sacrificing the advantages of semiclosed slots. In a formed coil the windings are preformed and the position of each wire relative to each of the other wires is known prior to insertion in the slot.

It is an object of the present invention to provide a magnetic slot wedge that results in reduced slot harmonic losses and sufficient mechanical strength to carry all the forces the wedge is exposed to.

It is a further object of the present invention to provide a magnetic slot wedge that results in reduced space harmonic losses and permits formed windings to be used.

It is a still further object of the present invention to provide a magnetic slot wedge which reduces the slotting harmonics with a minimum increase in slot leakage reactance.

It is another object of the present invention to provide a magnetic slot wedge that is easily manufacturable and the resulting magnetic slot wedge is easily assembled in the stator slots.

SUMMARY OF THE INVENTION

In one aspect of the present invention magnetic wedges are provided for use in a toothed stator. The magnetic wedges hold the stator windings in the slots formed between the teeth of the stator. Each magnetic slot wedge comprises a stack of laminations of magnetic material, each lamination having a width corresponding to the width of the slot. The laminations each have a central bridge portion that is sufficiently narrow in the radial direction to saturate during machine operation. A support means of nonmagnetic and nonconductive material is located adjacent to the narrow central bridge portion of the stack to provide stiffness in the direction perpendicular to the plane of the laminations.

BRIEF DESCRIPTION OF THE DRAWING

While the specification concludes with claims particularly pointing out and distinctly claiming the present invention, the objects and advantages of the invention can be more readily ascertained from the following description of a preferred embodiment when used in conjunction with the accompanying drawing in which:

DETAILED DESCRIPTION OF THE PRESENT INVENTION

Figure 1:
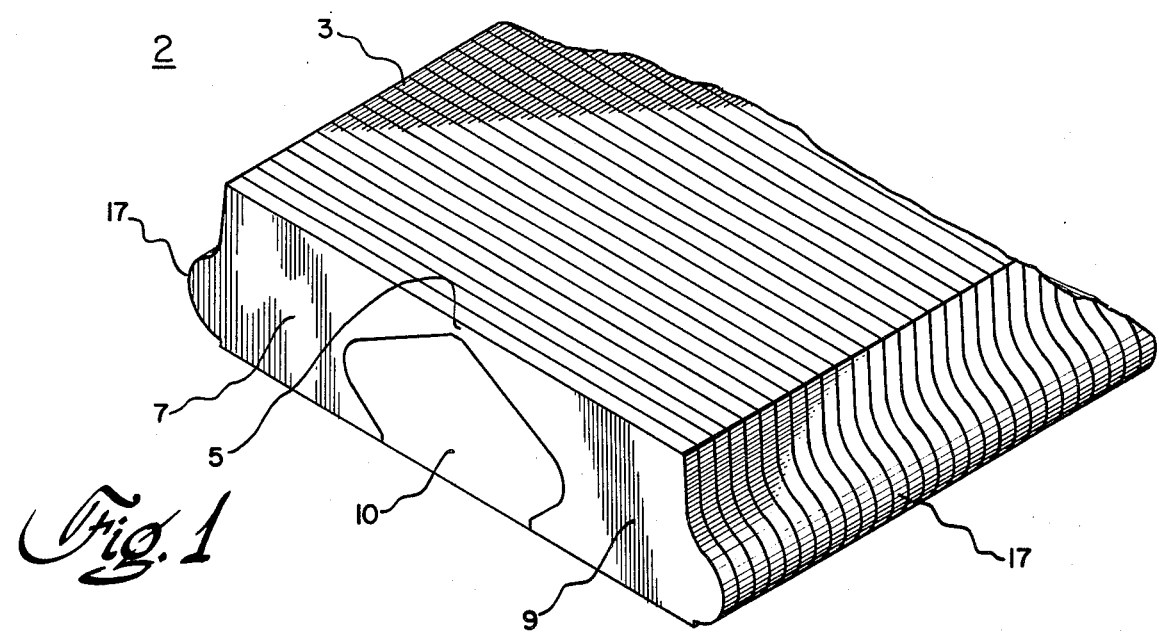
FIG. 1 is a perspective view of one embodiment of a magnetic slot wedge in accordance with the present invention.

Referring now to the drawing wherein like numerals indicate like elements, there is shown in FIG. 1 a magnetic slot wedge 2. The magnetic slot wedge has a stack of laminations 3, each lamination having a central bridge portion 5 connecting a first and second magnetic region 7 and 9, respectively. One side of the bridge 5 of each lamination forms a straight edge with the top of the first and second region across the width of the wedge providing a flat to to the wedge. The first and second regions and the bridge define an opening. The opening of each lamination when stacked aligns with the opening of each other lamination to form a channel with a narrowed entrance. A nonmagnetic nonconductive rod which in the present embodiment is a fiberglass reinforced plastic rod 10, is shaped to tightly fit in the channel. Since the entrance to the channel is narrower than the maximum width of the channel, the laminations clamp about the rod. The channel is not round, preventing the laminations from turning about the rod. The fiberglass reinforced plastic such as polyester fiberglass, can be pultruded to have the desired cross section. Pultruding is a continuous process of drawing numerous glass monofilaments through a resin bath and into a curing and shaping die.

Figure 2:
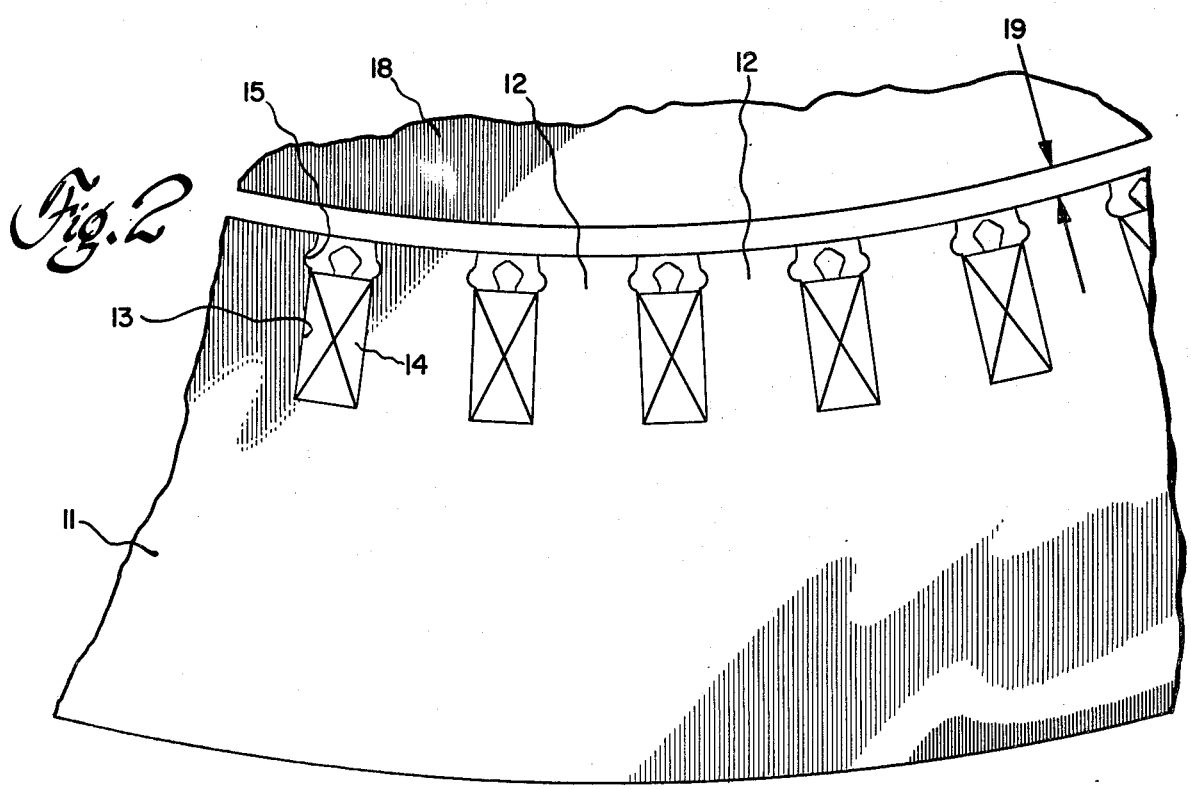
FIG. 2 is an end elevation view of a section of a toothed stator core with the slot wedge of FIG. 1 positioned between the teeth.

Referring now to FIG. 2, a portion of a laminated toothed stator core 11 is shown. Positioned between teeth 12 are slots 13. Formed windings 14 are in each slot. Near the open end of each slot on either side are wedge grooves 15 into which protrusions 17 on the magnetic slot wedges of FIG. 1 are slid. The magnetic slot wedges extend the axial distance of the slot. The tops of the magnetic slot wedges are flush with the tops of the teeth or can be recessed slightly to obtain some mechanical protection for the slot wedges. The recess would be on the order of 5 mils for a core with an inside diameter of 10″. The outline of a rotor 18 is shown with the distance between the inside diameter of the stator and the outside surface of the rotor shown as 19, representing the air gap.

The wedges can be degreased in a suitable degreaser such as Freon ® and bonded using vacuum pressure impregnation before assemblying in the core. Alternatively, the magnetic slot wedges could be placed in the core and the core bonded using a hot shot vacuum pressure impregnation as described in U.S. Pat. No. 3,904,785, issued Sept. 9, 1975 and assigned to the instant assignee hereby incorporated by reference.

Since the magnetic slot wedge fits into notches in the stator slot, formed windings can be used where required without the penalty of relatively high harmonic losses and can further provide the advantages of allowing greater slot fill and predetermined positioning between coil wires which would not be possible if a semiclosed slot design was used.

In operation, the narrow portion of the bridge, which is narrow in the radial direction, saturates in the presence of the magnetic field produced by the stator windings during machine operation, causing a gradual transition of flux density across the slot and thereby reducing the higher order slotting harmonics. The saturation of the central bridge portion 5 also results in a smaller leakage reactance than that which would result in a design without saturation. A smaller leakage reactance is desirable. The laminations of the magnetic slot wedge reduce the current flowing in the magnetic slot wedges and therefore reduce the losses due to the AC fields.

Figure 3:
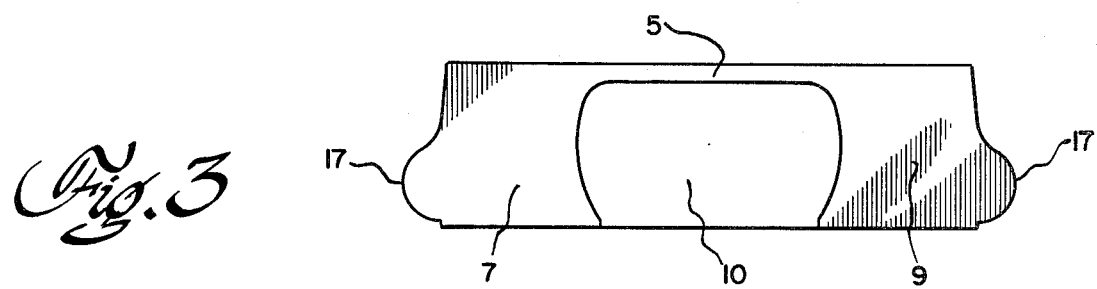
FIG. 3 is an end elevation view of another embodiment of a magnetic slot wedge in accordance with the present invention.

An alternative embodiment of the laminated magnetic slot wedge is shown in FIG. 3. A central bridge portion 5 which saturates during operation is wider in a circumferential direction than the central bridge portion in FIG. 2 that saturates, resulting in a larger effective slot opening. The larger effective slot opening results in a lower leakage reactance with a slight increase in harmonic losses as compared to the embodiment shown in FIG. 1. The top of the wedge in FIG. 1 has a narrower saturated region and is more resistant to fatigue failure from magnetic and mechanical sources.

The foregoing describes a magnetic slot wedge that results in reduced slotting harmonic losses and sufficient mechanical strength to carry all the force the wedge is exposed to. The magnetic slot wedge permits the use of form windings and is easy to manufacture and insert into a stator core.

While the invention has been particularly shown and described with reference to several embodiments thereof, it will be understood by those skilled in the art that various changes in the form and details may be made therein without departing from the spirit and scope of the invention.

What is claimed is:

1. A magnetic wedge for closing the stator slots of a toothed stator core of an AC machine, said magnetic wedge comprising:
   a nonmagnetic and nonconductive support rod; and a stack of laminations of magnetic material, each lamination having two regions of magnetic material joined by a bridge portion narrow in the radial direction which saturates during machine operation, said bridge portion being narrowed in the radial direction at its center portion and becoming wider as distance from the first and second region decreases, the two regions and said bridge defining an opening which aligns with the opening in each other lamination in said stack of laminations so as to define a channel having a narrowed entrance, said rod being positioned in said channel with each lamination having a clamp fit about said rod.

2. A stator for a rotating electric machine comprising:
   a stator winding;
   a toothed stator core in which successive teeth form slots therebetween, the stator winding being positioned in said slots;
   a plurality of slot wedges positioned such that the tops of said wedges are substantially flush with the ends of said teeth, each of said slot wedges comprising a plurality of laminations of magnetic material arranged in a stack, each lamination having a width corresponding to the slot width and having a central bridge portion joining a first and second magnetic region and defining an opening in the lamination, said bridge portion being narrowed in the radial direction at its center portion and becoming wider as distance from the first and second region decreases, the openings of each lamination defining a channel in said stack of laminations having a narrowed entrance; and
   a nonconductive nonmagnetic support rod positioned in said channel with said laminations clamping about said rod.

3. The wedge of claim 2 wherein one side of said bridge portion of each lamination forms a straight edge with the first and second region across the width of the wedge, thereby providing a flat top to the wedge.

4. The stator of claim 2 wherein the top side of the central bridge portion forms a straight edge with the first and second magnetic regions across the width of the wedge.

* * * * *